(12) United States Patent
Wang

(10) Patent No.: US 8,806,972 B2
(45) Date of Patent: Aug. 19, 2014

(54) TELESCOPING ROD STRUCTURE FOR LINEAR ACTUATOR

(75) Inventor: Chia-Jung Wang, Xindian (TW)

(73) Assignee: T-Motion Technology Co., Ltd., New Taipei (TW)

( * ) Notice: Subject to any disclaimer, the term of this patent is extended or adjusted under 35 U.S.C. 154(b) by 162 days.

(21) Appl. No.: 11/743,757

(22) Filed: May 3, 2007

(65) Prior Publication Data
US 2008/0273923 A1    Nov. 6, 2008

(51) Int. Cl.
*F16C 11/02* (2006.01)
*F16H 25/20* (2006.01)

(52) U.S. Cl.
CPC .......... *F16H 25/20* (2013.01); *F16H 2025/209* (2013.01); *F16H 2025/2084* (2013.01); *F16H 2025/2037* (2013.01)
USPC ............................... 74/89.23; 403/60; 403/67

(58) Field of Classification Search
USPC ........... 403/150, 151, 152, 153, 154, 155, 59, 403/60, 67, 157, 158, 72, 79, 119, 161; 74/524, 548, 89.23, 89.32; 384/295, 384/428
See application file for complete search history.

(56) References Cited

U.S. PATENT DOCUMENTS

| 787,775 | A | * | 4/1905 | Lewis | 403/154 |
| 1,211,582 | A | * | 1/1917 | Hobart | 403/154 |
| 1,872,099 | A | * | 8/1932 | Urschel | 403/119 |
| 1,903,863 | A | * | 4/1933 | Hayden | 403/79 |
| 1,939,959 | A | * | 12/1933 | Dick | 403/154 |
| 2,056,079 | A | * | 9/1936 | Ramspeck | 403/154 |
| 2,064,692 | A | * | 12/1936 | Shank | 403/158 |
| 3,058,792 | A | * | 10/1962 | Elford et. al. | 403/155 |
| 5,979,592 | A | * | 11/1999 | Delgado | 181/200 |
| 6,669,393 | B2 | * | 12/2003 | Schilling | 403/2 |
| 8,002,489 | B2 | * | 8/2011 | Mahy et al. | 403/158 |
| 8,312,783 | B2 | * | 11/2012 | McKay | 74/89.23 |
| 2004/0265048 | A1 | * | 12/2004 | Vanhille et al. | 403/151 |

FOREIGN PATENT DOCUMENTS

DE    20 2004 000 950 U1 *  5/2004  ............... H02K 7/06

* cited by examiner

*Primary Examiner* — Michael P Ferguson
(74) *Attorney, Agent, or Firm* — Chun-Ming Shih; HDLS IPR Services

(57) ABSTRACT

A telescoping rod structure, for a linear actuator, arranged at a connecting position of a telescoping rod of a linear actuator, mainly includes a telescoping rod, a sleeve, and a connecting cap, wherein the telescoping rod is connected to a linear transmitting mechanism, and an accommodating groove passing through the telescoping rod is arranged at top of the telescoping rod; furthermore, the sleeve, arranged in the accommodating groove, is a hollow pipe piece for accommodating a connecting element to pass through; finally, the cap is a hollow lid body, the peripheral of which is arranged a plurality of corresponding projecting seats, at each of which a thorough hole is arranged such that, when the cap is fitted onto the top of the telescoping rod, it may fix the position of the sleeve arranged at the accommodating groove, in the meantime, by making the thorough holes just correspond to the hollow position of the sleeve, it being able to facilitate the connecting element to be fitted and connected securely therein.

1 Claim, 8 Drawing Sheets

TELESCOPING ROD STRUCTURE FOR LINEAR ACTUATOR

BACKGROUND OF THE INVENTION

1. Field of the Invention

The present invention generally relates to a linear transmission mechanism, in particular, to a telescoping rod of a linear actuator.

2. Description of Prior Art

The linear transmission mechanism commonly seen in current market, for example, linear actuator, is a kind of assembly driven by motor, gear set, and connecting rod, etc., wherein a lead screw is brought along to rotate by the power generated from the motor, so that it may facilitate a telescoping rod generating an telescoping action in linear direction, by which other assembly connected to the telescoping rod may generate pushing and pulling actions, which are generally seen in our daily lives, for example, a patient bed moved vertically and a mini-elevator loaded with objects, which are all application examples of linear transmission mechanism.

In particular, the telescoping rod is one critical component to be connected to other assemblies, and the stability of the connecting structure of the telescoping rod will directly influence the pushing and pulling actions to be brought along and generated smoothly. As shown in FIG. 1, according to a prior structure, a universal joint 102 is screwed on top of a telescoping rod 101 and has an accommodating groove 103 penetrating the main body thereof for facilitating a connecting element to be accommodated in the accommodating groove 103, whereby a connecting relationship between the telescoping rod 101 and other assemblies may be secured. However, since of the high cost of the universal joint 102, its inventory cost is relatively high for manufacturers.

As shown in FIG. 2, according to another prior structure, an accommodating groove 103 is directly disposed at the rod head of a telescoping rod 101, and a sleeve 104 arranged in the accommodating groove 103a is tightly fitted and connected therein for facilitating a connecting element to be arranged in the sleeve 104. Although this structure may lower down the cost significantly, it is difficult to install other sleeve 104 with different outer radius in any time. Once a sleeve 104 is tightly fitted into the accommodating groove 103a, the linear transmission mechanism can only be matched with a connecting element with an outer radius same as the inner radius of the sleeve 104, thus causing an inconvenient usage. Furthermore, it is easy to make the sleeve 104 generate wearing deformation and dropped off after long usage, so there is a worrisome on structural security as well.

As shown in FIG. 3, a further prior structure is to arrange a radial accommodating groove 103a at the position of the rod head of a connecting rod, and a sleeve 105 is formed and secured in the accommodating groove 103a by means of powder-pressing process, whereby the drawback of easy wearing and deformation according to aforementioned structure that is constructed by tight fitness may be avoided. However, this kind of method still has the difficulty to install other connecting element with different radial size. Furthermore, since the sleeve 105 is made of powder material under a powder-pressing process of high temperature and high pressure, its structure is easily squeezed to incur smashing phenomenon, which is dangerous to the connected structure in terms of safety and stability.

Therefore, under the considerations of structural safety and the convenience of changing parts besides cost expense, it is indispensable to perceive a solution to overcome the drawbacks of prior arts.

SUMMARY OF THE INVENTION

Aiming to solve aforementioned drawbacks, the main objective of the invention is to provide a telescoping rod's structure, for a linear actuator, capable of applying a cap to hold a sleeve with variable inner radius and, since of the application of the detachable connecting cap arranged at top of the telescoping rod, not only the position of the sleeve arranged in the interior of the telescoping rod may be held, but also other sleeves with different inner radiuses but same outer radius may be interchanged. Because the cap can be detached, the limitations of inventory's preparation and cost can be reduced significantly.

In order to achieve aforementioned objectives, the invention is to provide a telescoping rod's structure for a linear actuator, mainly consisting of a telescoping rod, a sleeve, and a connecting cap, wherein the telescoping rod is connected to a linear transmission mechanism, and an accommodating groove passing through the telescoping rod is arranged at top of the telescoping rod; furthermore, the sleeve, arranged in the accommodating groove, is a hollow pipe piece for accommodating a connecting element to pass through; finally, the cap is a hollow lid body, the peripheral of which is arranged a plurality of corresponding projecting seats, at each of which a through hole is arranged such that, when the cap is fitted onto the top of the telescoping rod, it may fix the position of the sleeve arranged at the accommodating groove, in the meantime, by making the through holes just correspond to the hollow position of the sleeve, it being able to facilitate the connecting element to be fitted and connected securely therein.

BRIEF DESCRIPTION OF DRAWING

The features of the invention believed to be novel are set forth with particularity in the appended claims. The invention itself, however, may be best understood by reference to the following detailed description of the invention, which describes several exemplary embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of preferable embodiments, being not used to limit its executing scope. Any equivalent variation and modification made according to appended claims is all covered by the claims claimed by the present invention.

Figure 1:
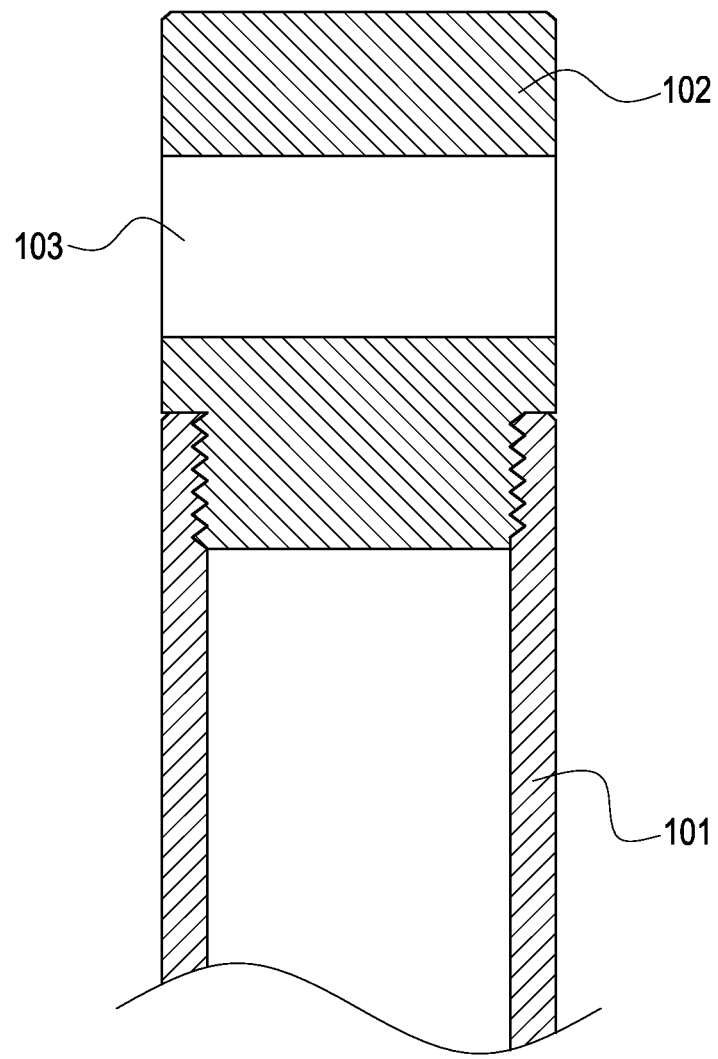
FIG. 1 is a structural cross-sectional illustration according to a prior art.
Figure 2:
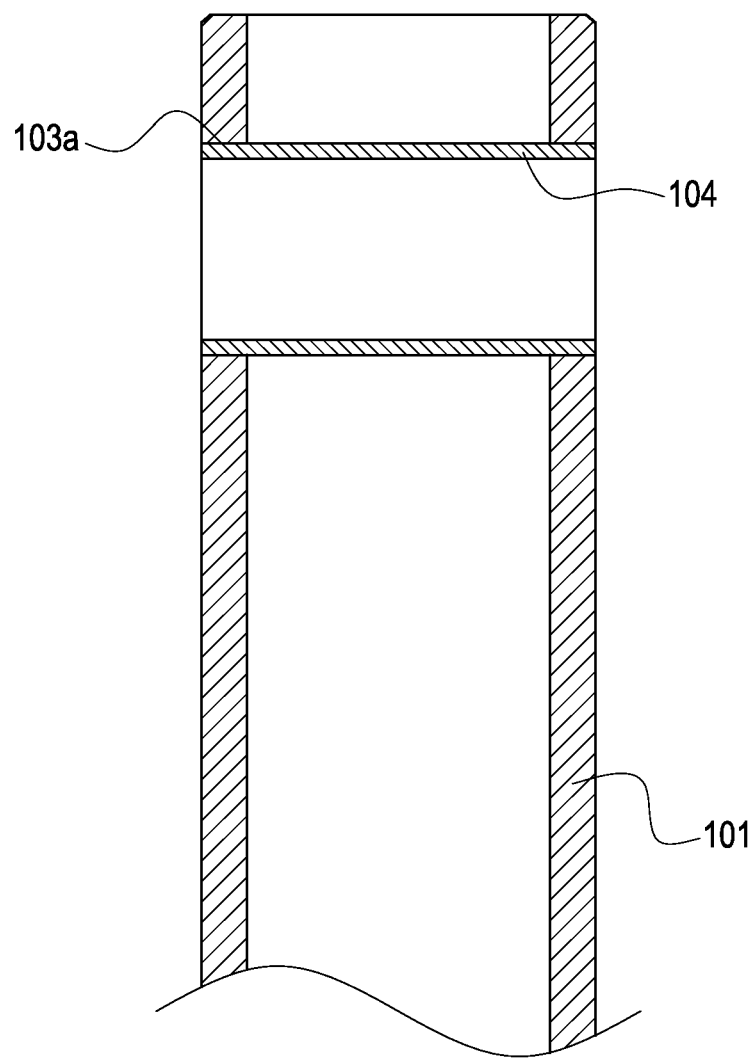
FIG. 2 is another structural cross-sectional illustration according to a prior art.
Figure 3:
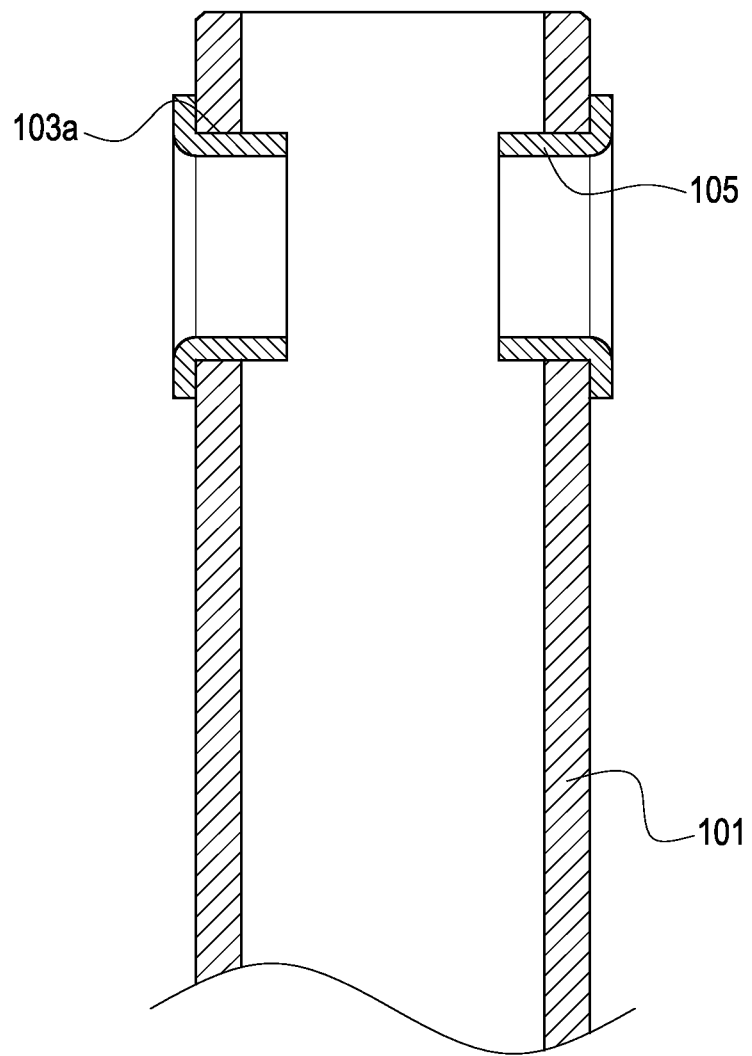
FIG. 3 is a further structural cross-sectional illustration according to a prior art.
Figure 4:
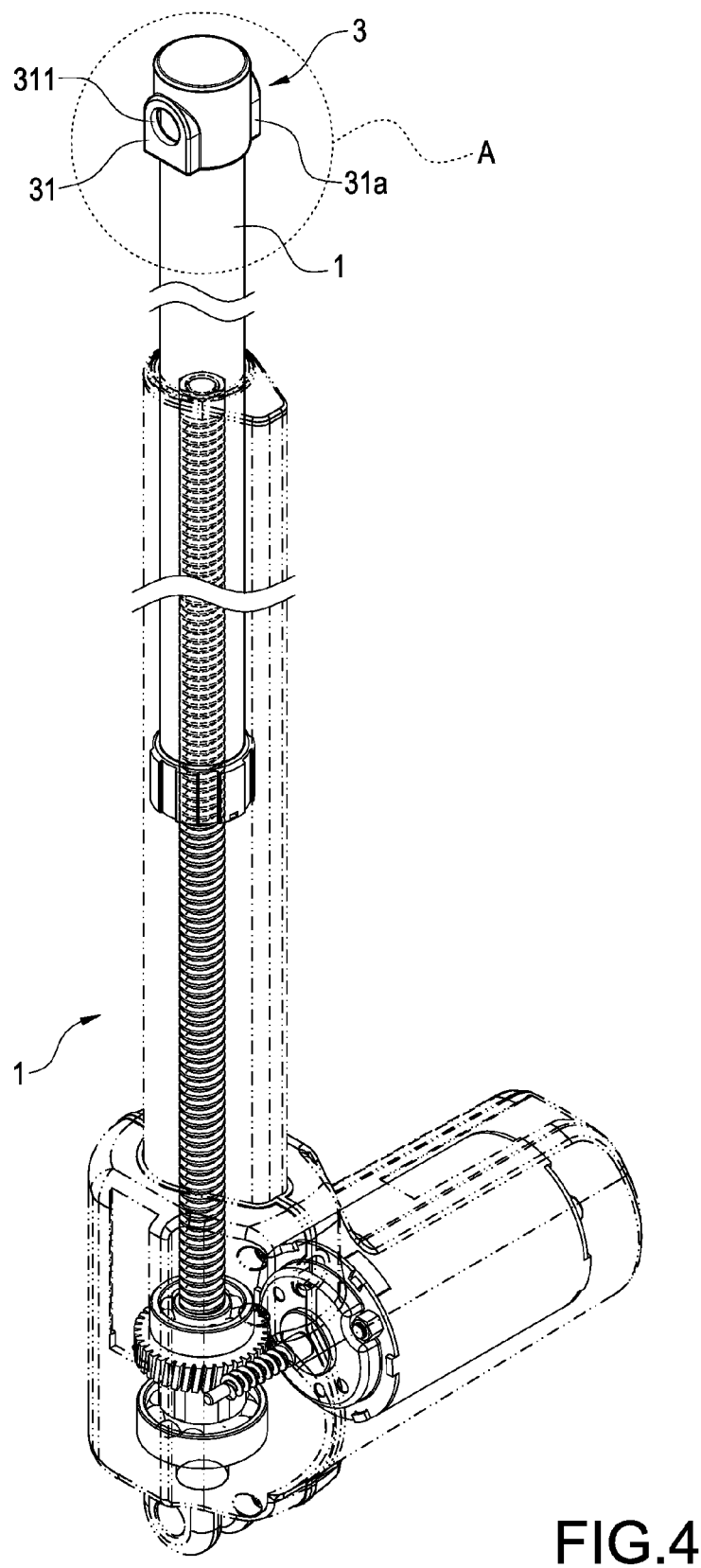
FIG. 4 is a perspective illustration of an embodiment according to the present invention.
Figure 5:
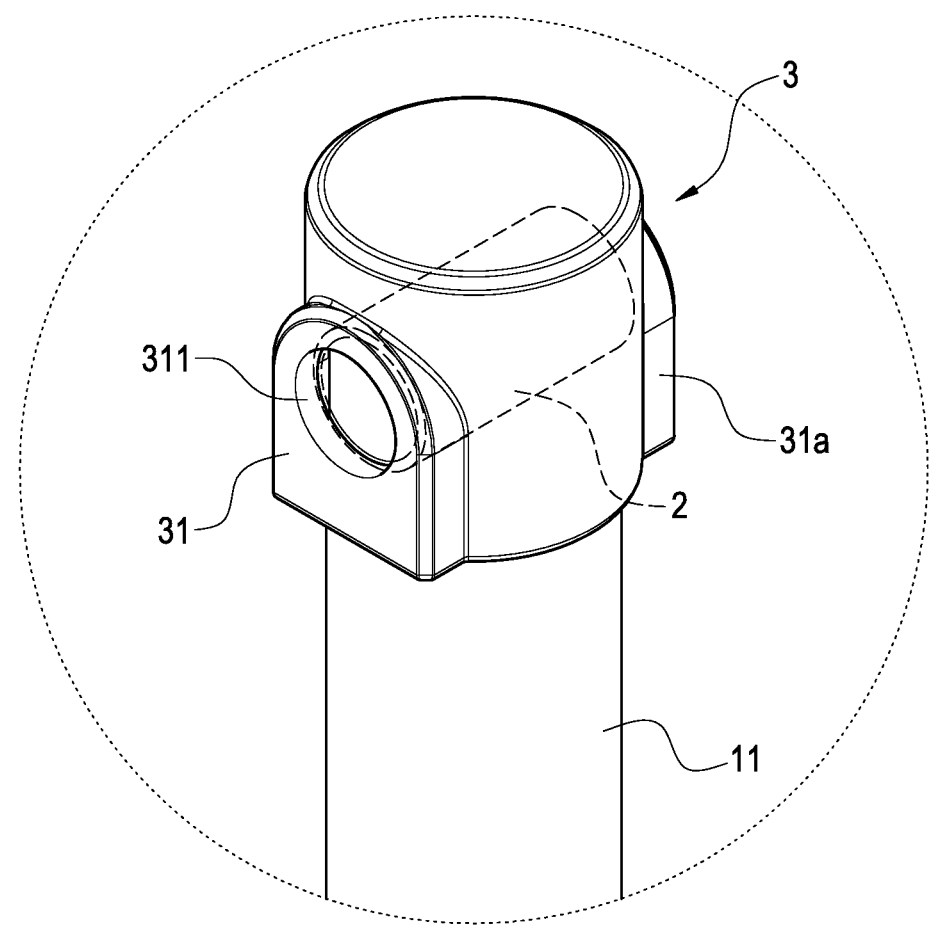
FIG. 5 is a perspective view illustrating a local structure of the embodiment according to the present invention in FIG. 4 in an enlarging scale.
Figure 6:
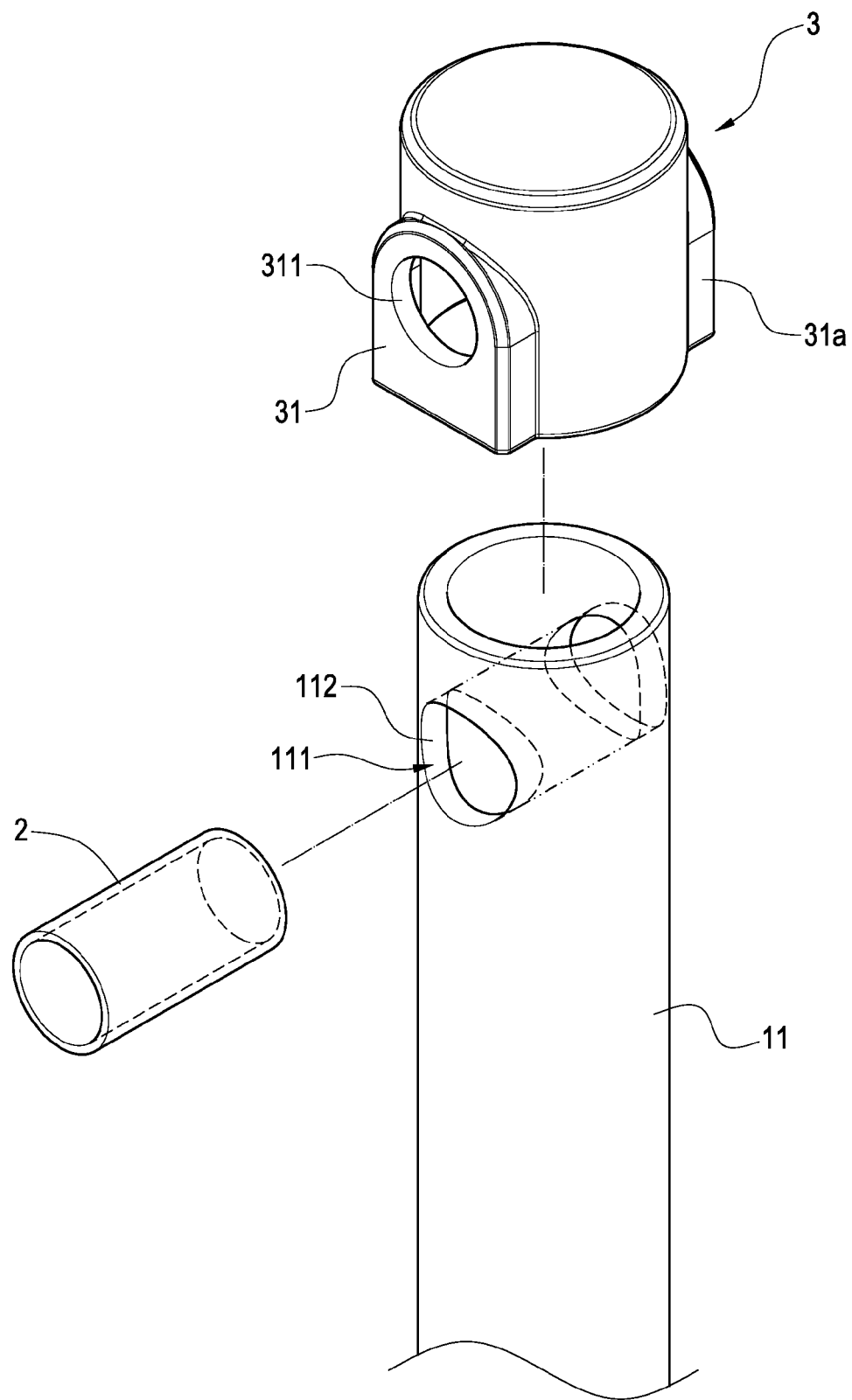
FIG. 6 is a perspective explosive view showing the structure of the embodiment according to the present invention in FIG. 5.

Please refer to FIG. 4 and FIG. 5, which respectively are a perspective structural illustration and a perspective enlarging view of local structure of an embodiment according to the present invention. As shown in FIG. 4, a telescoping rod's structure according to the present invention is arranged at top of a telescoping rod 11 of a linear actuator 1, and its perspective enlarging illustration is shown in FIG. 5. Please further refer to FIG. 6, which is a perspective structural explosive view of the embodiment according to the present invention in FIG. 5, and the telescoping rod's structure mainly comprises a telescoping rod 11, a sleeve 2, and a connecting cap 3, wherein the telescoping rod 11 is a hollow pipe body, on the wall surface of which a plurality of through holes are arranged corresponding to each other to form an accommodating groove 111, which penetrates the main body of the telescoping rod 11 in radial direction and is arranged below the top of the telescoping rod 11 for accommodating the sleeve 2; furthermore, the sleeve 2, the outer surface of which is just tightly arranged in the accommodating groove 111, is a hollow pipe body to be fitted with a connecting element; finally, the interior of the connecting cap 3 is a hollow body, which houses the top of the telescoping rod 11 and is tightly fitted thereon, and the peripheral of which arranges at least one projecting seat 31. In this embodiment, a plurality of corresponding projecting seat 31 and 31a are arranged, and the wall surface of the cap 3 is arranged at least one through hole 311, the position of which just corresponds to the position of the projecting seat 31. In this embodiment, the cap 3 is arranged a plurality of through holes 311 and 311a, both of which respectively correspond to the projecting seat 31 and 31a.

Figure 7:
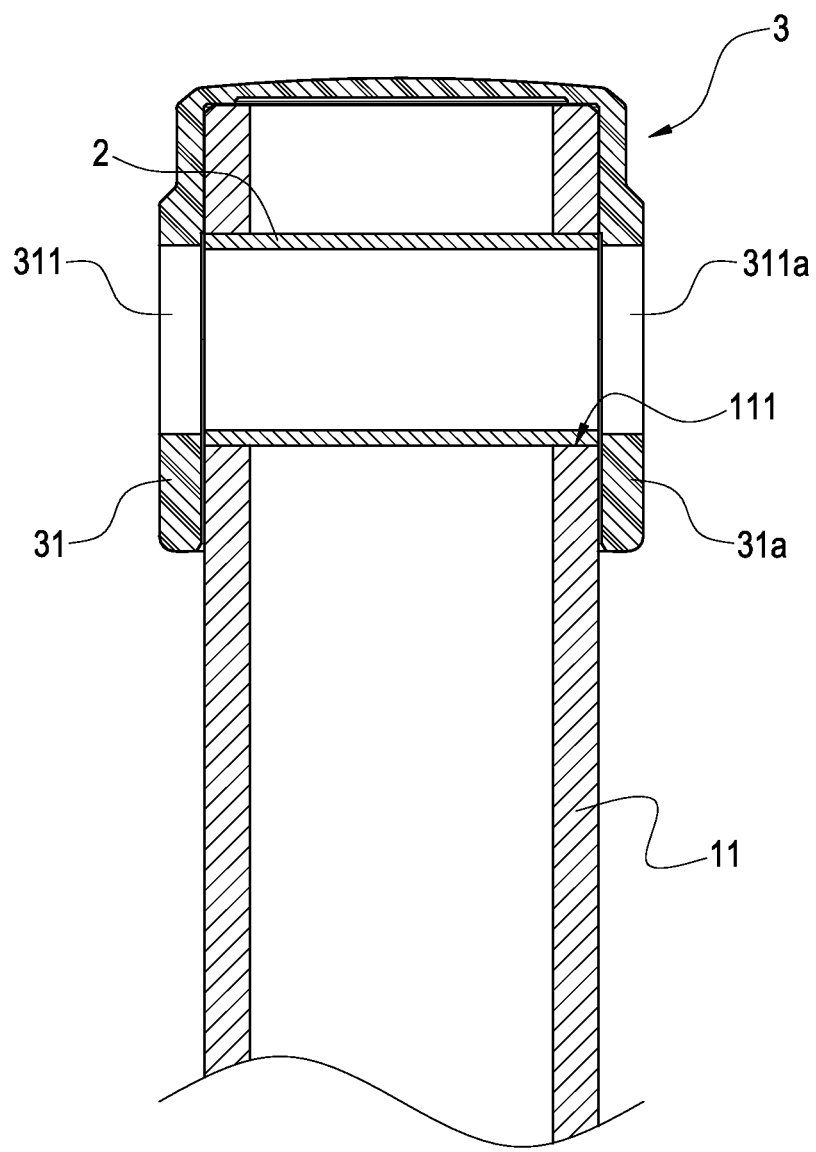
FIG. 7 is a cross-sectional view showing the assembled structure of the embodiment according to the present invention in FIG. 5; and, FIG. 8 is a cross-sectional view showing the assembled structure of another embodiment according to the present invention.

Please refer to FIG. 7, which is a cross-sectional view of the assembled structure of the embodiment according to the present invention in FIG. 5. After the connecting cap 3 being fitted onto the top of the telescoping rod 11, the peripheral edge of the cap 3 just covers the radial accommodating groove 111 arranged on the telescoping rod 11 in a way, such that the sleeve 2 in the accommodating groove 111 is fixed therein, making the sleeve 2 unable to be moved horizontally or even dropped off, because of the operation of the linear actuator. In the meantime, the positions of the projecting seats 31, 31a are adjusted corresponding to the position of the radial accommodating groove 111, making the through holes 311, 311a arranged at the projecting seats 31, 31a respectively corresponding to the positions of two side openings of the sleeve 2. In this embodiment, the radiuses of the through holes 311, 311a are substantially equal to the inner radius of the sleeve 2, so that it may facilitate the sleeve 2 to accommodate a connecting element with same radius.

Figure 8:
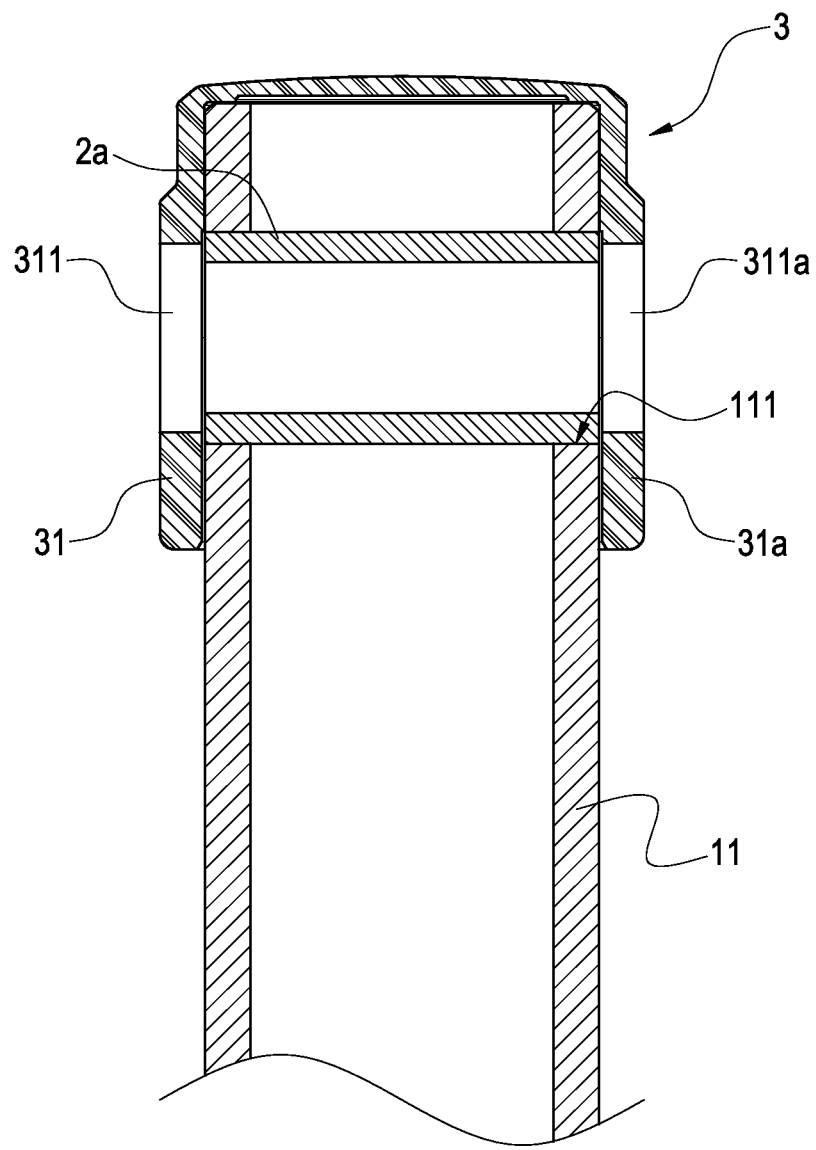

In addition, as shown in FIG. 8, the cap 3 is also capable of holding a sleeve 2 with same outer radius but with different inner radius. In this embodiment, the inner radius of the sleeve 2a is substantially smaller than the radiuses of the through holes 311, 311a arranged at the peripheral of the cap 1. Thereby, in cooperation with the detachable cap 3, it may provide a number of sleeves 2 with different inner radiuses to be assembled on the telescoping rod 11, which facilitates inventory preparation and parts exchange, and thus the inventory cost may be lowered down significantly.

Aforementioned structures are only preferable embodiments of the present invention, being not used to limit its executing scope. Any equivalent variation and modification made according to appended claims is all covered by the claims claimed by the present invention.

What is claimed is:
1. A linear actuator, comprising:
a lead screw;
a telescoping rod comprising a hollow cylindrical body threadedly engaged with the lead screw for generating a telescoping action in a linear direction with respect to the lead screw so that another assembly connected to the telescoping rod performs pushing and pulling actions, a distal end of the telescoping rod comprising an accommodating passage penetrating opposing sides of the hollow cylindrical body and forming diametrically opposing openings in the cylindrical body;
a plurality of sleeves, each of which comprises a hollow pipe body sized to be frictionally fit in the accommodating passage by engaging two ends of the sleeve with the diametrically opposing openings, respectively, and each sleeve having a different inner radius for receiving a different diameter connecting element; and
a detachable cylindrical connecting cap, which is friction fitted onto a top of the telescoping rod at a position with a cap top directly sitting on the distal end of the telescoping rod, where the accommodating passage and the sleeve are just covered by the connecting cap for holding the sleeve friction fitted in the accommodating passage, the connecting cap comprising two diametrically opposing projecting seats each extending from the periphery of the connecting cap to define a planar surface which circumferentially encloses a respective one of the diametrically opposing openings in the telescoping rod and extends to an open lower end of the connecting cap, and a through hole being formed in each of the two planar surfaces of the two projecting seats corresponding to the positions of the two openings, respectively,
thereby, in cooperation with the connecting cap, the plurality of sleeves with different inner radiuses are provided to be individually assembled in the telescoping rod, which facilitates exchange of the sleeves for receiving different diameter connecting elements therein,
wherein an inner radius of one of the plurality of the sleeves is substantially equal to the radius of the two through holes in the connecting cap, and
wherein an inner radius of another of the plurality of the sleeves is substantially smaller than the radius of the two through holes.

* * * * *